June 14, 1949.    J. D. RUSSELL    2,472,860
COMBINED CABLE GUIDE ARM AND TORQUE CONTROL SWITCH
Filed Sept. 2, 1944
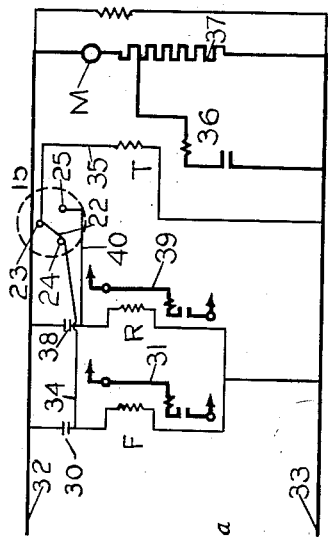
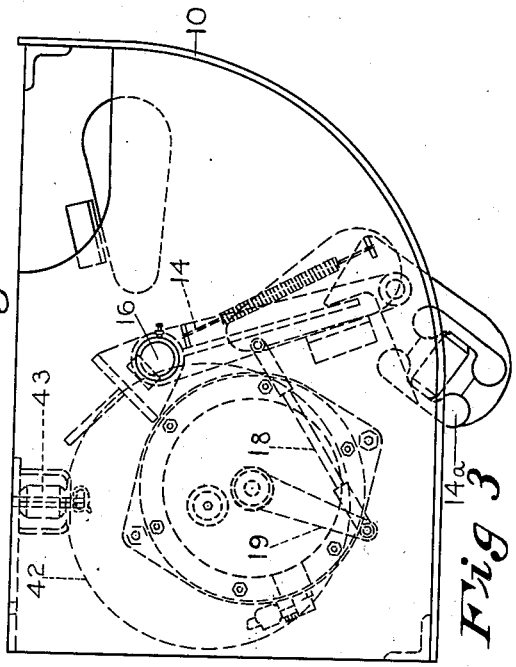
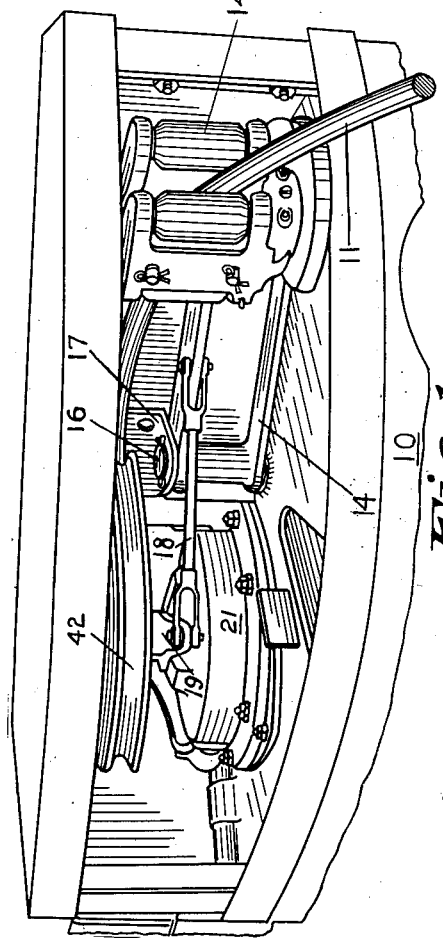
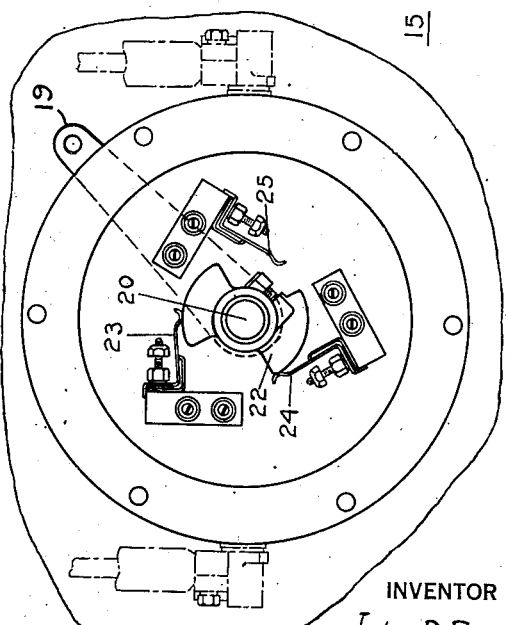
INVENTOR
John D. Russell
BY
Harold W. Hawkins
ATTORNEY Patented June 14, 1949

2,472,860

UNITED STATES PATENT OFFICE 2,472,860

COMBINED CABLE GUIDE ARM AND TORQUE CONTROL SWITCH

John D. Russell, Cranberry Township, Venango County, Pa., assignor to Joy Manufacturing Company, a corporation of Pennsylvania Application September 2, 1944, Serial No. 552,536

40 Claims. (Cl. 191—12)

This invention relates to cable guides, and more particularly to a combined cable guide arm and torque control switch for use on electrically operated vehicles supplied with power through a cable wound on a reel carried by the vehicle.

While my invention may be used on any vehicle having a cable reel, it is especially adapted for use in connection with a shuttle car of the general character disclosed in U. S. Letters Patent No. 2,325,731, issued August 3, 1943. Such cars, which are now in general use in the mining fields of this country, are used to perform the secondary haulage in the mine, and shuttle back and forth between the mineral producing area and a discharge station in transporting the minerals from the working face to the main line haulage of the mine. The cars are supplied with power through a cable, one end of which is attached to a constant source of power, and is anchored at a point near the discharge station. The cable is wound on a reel driven by a suitable motor which is arranged to permit the reel to unwind or pay out the cable as the car moves away from the point where the cable is anchored, and to wind up or reel in the cable as the car moves in the opposite direction. The distance of travel of vehicles of this type is controlled by the length of cable wound on the reel, and the cars cannot readily run past the point where the cable is anchored without danger of damaging the cable.

The principal object of this invention is to provide means for materially increasing the range of travel of an electrically operated vehicle supplied with power through a cable wound on a reel carried by the vehicle without increasing the length of the cable.

Another object is to provide a cable guide which will guide the cable as it is payed out and reeled in in such a manner that danger of the vehicle's running over and damaging the cable is reduced to a minimum.

Another object is to provide a combined cable guide arm and control switch for the torque motor operating a cable reel that will cause the required torque to be applied to the cable reel when the cable is being picked up, and will suitably reduce the amount of torque of the motor when the cable is being payed out.

A further object is to provide a torque control switch for the motor operating a cable reel which will control the amount of torque applied to the cable reel in accordance with the relative position of the vehicle to the anchor point of the cable, and will automatically provide the maximum torque when the vehicle is approaching the anchor point, and a suitably reduced torque as the vehicle moves away from the anchor point, whereby the vehicle may run past the anchor point and its range of travel be materially increased.

These and other objects which will hereinafter be made apparent to those skilled in this particular art are accomplished by means of this invention, one embodiment of which is described in the following specification and illustrated in the accompanying drawing, wherein:

Fig. 1 is a perspective view of my improved combined cable guide arm and torque control switch mounted on the forward end of a shuttle car;

Fig. 2 is a bottom plan view of the control switch with the cover removed;

Fig. 3 is a top plan view of the cable guide arm and torque control switch with the guide arm turned to lay the cable along the side of the car;

Fig. 4 is a diagram illustrating one method of wiring the control switch with the controls of the vehicle;

Fig. 5 is a diagrammatic view illustrating the range of operation of a shuttle car having a cable guide arm and torque control switch made in accordance with my invention.

Referring first to Fig. 5 of the drawings, 10 illustrates an electrically operated shuttle car of the type used extensively to perform the secondary haulage in mining operations, which is adapted to travel back and forth in the mine chamber A between the working face B and the haulage entry C. The car 10 is supplied with power through a cable 11 connected and anchored at 12 to a suitable source of electric power. The cable 11 is normally reeled on a suitable motor-driven cable reel, not shown, carried by the shuttle car 10, which is designed to wind up or reel in the cable as the car approaches the anchor point 12, and to pay out or unreel the cable as the car moves away from the anchor point.

The amount of pull on the cable is desirably greater when the cable is picked up than it is when the cable is being payed out, and to secure this difference in pull and permit the car to travel past the anchor point 12 in either direction, I employ a torque motor M (Fig. 4) for driving the cable reel, and provide means for controlling the torque of the motor. In order to reduce the torque of the motor M as the car 10 passes the anchor point 12 while traveling from A to C or vice versa, I provide a swinging cable guide arm 14 (Fig. 1) which is adapted to be turned by the cable as the car passes the point 12, and operate a switch 15 reducing the torque on the motor M as will hereinafter be more fully explained.

The cable guide arm 14 is provided with cable guide rollers 14a at its forward end, and is pivotally mounted on a vertical pin 16 journaled in a bracket 17 on the forward end of the shuttle car 10. Guide arm 14 is connected by a rod 18 with a lever 19 secured to a vertical shaft 20 journaled in a housing 21 which is bolted to the frame of the shuttle car 10. The shaft 20 carries a revolvable drum 22 of the switch 15. The drum 22 is adapted to engage two of a series of three contact fingers 23, 24, and 25, which are connected with the forward and reverse switches controlling the operation of the car 10.

Assuming that the shuttle car 10 is in the full line position shown in Fig. 5 and it is desired to travel from the working face B to the entry C. The forward operating switch 30 (Fig. 4) is manually closed, energizing the forward contactor F, closing the circuit 31, and power from the conductors 32 and 33 is delivered to the main motors, not shown, of the shuttle car 10. When the car is in this position at the working face, the cable 11 lies directly in the path that the car will take, and the guide arm 14 extends out toward the front of the car. With the guide arm 14 in this position, the drum 22 of the switch 15 is held in engagement with the contacts 23 and 24, and current therefore flows through the lead 34, switch 15, and wire 35, and energizes the contactor T and closes the circuit 36, and thereby shunts the major part of the resistance 37 which has been in series with the armature of the torque motor M, which, as will be hereinafter explained, operates at its maximum torque when said shunting circuit is closed, and exerts the maximum pull to wind up the cable. It will be observed that the motor M was supplied with current by the conductors 32 and 33 even before the circuit 31 is closed, though with the full resistance 37 in series with its armature. This means that the cable was maintained under suitable tension even before the car commenced to move.

As the car 10 passes the anchor point 12, the cable 11 causes the guide arm 14 to swing outwardly and project from the side of the car so that the cable will be payed out in a path parallel to the path of travel of the car. As the guide arm 14 is swung by the cable to its side position, the lever 19 and the shaft 20 secured thereto are turned, and the switch drum 22 is moved into contact with the fingers 23 and 25, and the circuit between the leads 34 and 35 is broken, which deenergizes the contactor T and opens the circuit 36. Current then flows from the leads 32 and 33 through the resistor or resistance element 37 arranged in series with the armature of the motor M, which reduces the torque of the motor to the required value. As the car proceeds toward the entry C, the cable is payed out against the torque of the motor M, and the resistor 37 is of such value that the torque of the motor is only sufficient to apply the proper amount of tension in the cable as it is being payed out from the cable reel. The car is stopped by opening the contactor F, shutting off the power to the traction motors. It will be noted that this will not cut off current supply to the motor M.

When it is desired to drive the vehicle in the opposite direction or toward the working face B, the reverse switch 38 is closed, which energizes the reverse controller R. On the energizing of the contactor R, the power circuit 39 is closed and current flows from the lead 32 through the power circuit 39 to the motors of the shuttle car 10, and the car starts to travel toward the working face. Upon the closing of the switch 38, a circuit is also established through the lead 40, switch parts 25, 22, and 23, and lead 35, which energizes the contactor T and closes the circuit 36. Upon the closing of the circuit 36, the major portion of the resistor 37 is shunted out, and the motor M is again caused to operate at its maximum torque to wind up the cable previously paid out as the car moves toward the working face.

As the car moves past the anchor point 12 on its return journey, the guide arm 14 is returned to its original position by action of the cable, and the drum 22 is moved from engagement with contact fingers 23 and 25 into contact with the fingers 23 and 24. This movement of the guide arm deenergizes the contactor T and opens the circuit 36, and again the full value of the resistor 37 is placed in series with the armature of the motor M and the torque is reduced to the minimum, and the cable is permitted to pay out as the car proceeds to its original position where the cycle of operation is completed.

It should be noted that when the drum 22 is in engagement with the fingers 23—24, the contactor T is in parallel with the forward contactor F, and when the drum contacts fingers 23—25, the contactor T is in parallel with the reverse contactor R. As a result of this method of wiring, when the forward contactor F is energized and the switch part 22 is in contact with fingers 23—24, the contactor T will also be energized.

Upon the turning of the guide arm, however, while the forward contactor F is still energized, the switch drum 22 will be turned into contact with the fingers 23 and 24, which deenergizes the contactor T and places it in parallel with the reverse contactor R, so that upon the energization of the reverse contactor, the contactor T will also be energized. Thus, regardless of the direction of travel of the car or of its position relative to the anchor point 12, the proper torque will be applied to the motor to wind in or pay out the cable whenever the car is started.

It should also be noted that with my improved guide arm the cable is laid down in a path parallel to the path of travel of the car when the car is moving forward beyond the anchor point, and consequently the danger of damaging the cable by its being run over by the car is materially reduced. To prevent any sharp bends in the cable 11 as it is payed out or reeled in, I mount a pulley 42 above the switch 15 which guides the cable from the rollers 14a on the end of the arm 14 to another set of guide rollers 43 mounted on the side of the vehicle.

While I have described one embodiment of my invention, it is understood that certain additions, modifications, omissions, and alterations may be made therein without departing from the spirit of my invention or the scope of the appended claims.

I claim:

1. The combination with an electrically driven shuttle car having a cable reel and a motor for driving said cable reel, a contactor for controlling the forward movement of said car, a contactor for controlling the reverse movement of said car, a resistor in series with the armature of said motor, means for shunting out the major portion of said resistor when either of said forward and reverse contactors is energized, and means for reinserting the full value of said resistor while maintaining one of said contactors energized.

2. The combination with an electrically operated vehicle supplied with power through a cable wound on a reel carried by the vehicle, of a contactor for controlling the forward movement of said vehicle, a contactor for controlling the reverse movement of said vehicle, a torque motor for driving said cable reel, means responsive to the energization of either of said contactors for operating said motor at its maximum torque, and means for reducing the torque of said motor without deenergizing said contactor.

3. The combination with an electrically operated vehicle supplied with power through a cable wound on a reel carried by said vehicle comprising a forward contactor, a reverse contactor, a torque motor for driving said cable reel, a resistance element in series with the armature of said motor, means responsive to the energization of either of said contactors for shunting out the major portion of said resistance element, and means for neutralizing said last mentioned means while maintaining the energization of said contactor.

4. The combination with an electrically operated vehicle supplied with power through a cable wound on a reel and carried by said vehicle, comprising a forward contactor, a reverse contactor, a torque motor for driving said cable reel, a resistance element in series with the armature of said motor, a contactor normally in parallel with one of said contactors and adapted on energization to shunt out said resistance element, and means for deenergizing said last mentioned contactor and placing it in parallel with the other of said contactors.

5. The combination with an electrically operated vehicle supplied with power through a cable wound on a reel carried by said vehicle comprising a torque motor for operating said reel, a cable guide arm pivoted on said vehicle adapted to lay said cable in a line parallel to the line of travel of the vehicle, and means responsive to the turning of said arm for varying the torque produced by said motor.

6. The combination with an electrically operated vehicle supplied with power through a cable wound on a reel carried by said vehicle comprising a torque motor for operating said cable reel, a resistance element in series with said motor, a contactor adapted on energization to shunt out said resistance element to permit said motor to develop the maximum torque, a swivel cable guide arm, and means responsive to the movement of said arm for deenergizing said contactor and reducing the torque of said motor.

7. The combination with an electrically operated vehicle supplied with power through a cable wound on a reel carried by said vehicle comprising a motor for operating said cable reel, a resistor in series with said motor, means for shunting out said resistor when said cable is being wound up to operate said motor at the required torque and means for automatically reinserting said resistor, while electrical operation of said vehicle in the same direction is maintained, to cause said motor to operate at minimum torque as the cable is being payed out.

8. Apparatus of the character described comprising a pivotally mounted arm, a cable guide carried on the forward end of said arm, said arm being adapted to be turned by the pull of the cable passing through said guide between positions in which said cable extends in relatively opposite directions, a magnetic contactor, and a switch actuated by the movement of said arm for controlling the energization of said contactor and having circuit closing positions at each of its opposite extremes of turning movement.

9. The combination with a cable reel and means for transporting the same, of a torque motor for operating said reel, a motor circuit, a resistor in said circuit in series with the armature of said motor, means for shunting out said resistor to increase the torque of said motor when said cable is being reeled in during transportation of said reel in a given direction, and means for automatically reinserting said resistor in the motor circuit when said cable is payed out during continued transportation of said reel in the same direction.

10. In combination with an electric motor-driven vehicle supplied with power through a cable wound on a reel carried by the vehicle, of a contactor for controlling the forward movement of said vehicle, a contactor controlling the rearward movement of said vehicle, a motor for driving said cable reel, a resistance element in series with the armature of said motor, a contactor normally in parallel with either the forward or reverse contactors and adapted to be energized when the contactor in parallel therewith is energized to shunt out said resistance element and increase the torque of said motor, and means for deenergizing said last mentioned contactor to reestablish the full value of said resistor to reduce the torque of said motor and for placing said contactor in parallel with the deenergized forward or reverse contactor.

11. The combination with a vehicle having a cable reel mounted thereon, with the power receiving end of said cable anchored intermediate the path of travel of said vehicle, of a torque motor for operating said cable reel, means for operating said motor at maximum torque when said vehicle is approaching the anchor point of said cable, and means for reducing the torque of said motor to a lower value as said vehicle moves past said cable anchor point.

12. The combination with a vehicle having a cable reel mounted thereon, with the power receiving end of said cable anchored intermediate the path of travel of said vehicle, of a torque motor for operating said cable reel, means for operating said motor at maximum torque when said vehicle is approaching the anchor point of said cable, and means responsive to the side pull of said cable for reducing the torque of said motor to the minimum as said vehicle moves past said cable anchor point.

13. The combination with a vehicle having a cable reel mounted thereon with the power receiving end of said cable anchored at a point along the path of travel of said vehicle, means for driving said cable reel at the required torque to wind up said cable as the car approaches the anchor point, and means for operating the cable reel at reduced torque to pay out said cable as the car moves past the anchor point.

14. The combination with a vehicle having a cable reel mounted thereon with the power receiving end of the cable anchored at a point along the length of travel of said vehicle, of means for driving said cable reel at the required torque to pick up said cable as the car approaches the anchor point, means responsive to the movement of said cable for driving said cable reel at a reduced torque as said vehicle moves away from said anchor point to pay out said cable, and means for laying said cable in a path substantially parallel to the path of travel of said car.

15. The combination with a vehicle having a cable reel mounted thereon with the power receiving end of the cable anchored at a point intermediate of the range of travel of the vehicle, a swingable cable guide arm, means for driving said cable reel at the torque required to wind up said cable as the vehicle approaches the anchor point, and means responsive to swinging of said guide arm for reducing the torque of said reel driving means to pay out the cable as the car moves away from the anchor point, said guide arm being arranged to lay the cable to the side of the vehicle when the vehicle is moving in one direction away from the anchor point.

16. A control system for a motor operating a cable reel on a vehicle for a cable supplying electrical energy to the vehicle from an extraneous source comprising, means operable to vary the torque of the cable reel motor, and means responsive to change in the angle of the cable, as the latter extends away from the vehicle, to the path of reel movement operable to control the torque varying means.

17. In a control system for a torque motor operatively connected to a cable reel for a power cable supplying electrical energy from an extraneous source to a vehicle, switch means operable to vary the armature current of the torque motor, and control means responsive to change in the angle of the cable, as the latter extends away from the vehicle, to the path of reel movement operable to effect operation of the switch means.

18. A control system for a cable reel motor on a vehicle having a cable for supplying electrical energy through a controller to a motor for operating the vehicle comprising, switch means operable to vary the torque of the reel motor, a control switch operable to different positions in response to changes in the angular relation of the cable to the reel, control means associated with the controller, and circuit means connecting the control means and the control switch for operating the switch means selectively in accordance with the direction of motion of the vehicle relative to the point of attachment of the cable to a source of electrical energy.

19. A control system for a motor operating a cable reel on a vehicle having a main driving motor disposed to be energized from a source of electrical energy through a cable carried by the reel comprising, circuit means connecting the cable reel motor to the cable, control means operable to vary the impedance of the circuit means, and means for effecting operation of the control means whenever the vehicle passes the point of attachment of the cable to the source including a movable arm actuated by the cable in accordance with a change in the angular relation of the cable to the reel.

20. A control system for a motor operating a reel for a cable disposed to be attached to a source of electrical energy for supplying electrical energy to a driving motor of a vehicle through a controller comprising, control means operable to change the torque of the reel motor, means associated with the controller operable to reduce the torque of the reel motor when the vehicle moves away from the point of attachment of the cable to the source on one side thereof, and means operable to reduce the torque of the reel motor as the vehicle moves away from the one side of the point of attachment to the other side.

21. The combination in a control system for a motor operating a reel mounted upon a vehicle for carrying a cable disposed to be attached to a source of electrical energy for supplying electrical energy to the vehicle, of a control impedance, switch means for connecting the impedance in series circuit relation with the reel motor, and control means including a movable switch arm operable to different positions depending upon which side of the point of attachment of the cable the vehicle is operating for effecting operation of the switch means as the vehicle passes the point of attachment of the cable to the source.

22. In a control system for a motor operating a cable reel on a vehicle for supplying electrical energy to the vehicle from a power source, in combination, control means operable to vary the torque of the reel motor, and a pivotal arm actuable to different positions to effect operation of the switch means, said arm having a guide member for receiving the cable and being actuable to different positions depending on changes in the angular relation of the cable with the reel as the vehicle moves from one side of the point of attachment of the cable to the other.

23. In combination, a reel mounted on a vehicle and carrying a cable disposed to be attached to a source of electrical energy for supplying electrical energy to the vehicle, a driving motor for operating the vehicle, a reel motor for operating the reel, control means operable to vary the torque of the reel motor, a controller for the vehicle driving motor having contact means operatively associated therewith for effecting operation of said control means whenever the vehicle driving motor is reversed, and additional control means responsive to the position of the vehicle relative to the point of attachment of the cable to the source for operating the control means whenever the vehicle passes the point of attachment, thereby to maintain a substantially constant tension on the cable.

24. In a cable reel system, in combination, a cable reel having an operating motor, control means operable to increase the torque of the reel motor, switch means operable to effect operation of the control means, and means comprising a pivotal arm having a guide for receiving the cable adjacent the free end for effecting operation of the switch means whenever the vehicle passes the point of attachment of the cable and the cable changes its angular relation with the reel.

25. A control system for a motor operating a cable reel on a vehicle having a driving motor energized through the cable from a source of electrical energy and control means for the motor comprising, a control resistor connected in series circuit relation with the reel motor, switch means operable to shunt a portion of the resistor, circuit means connected between the control means and the source for effecting operation of the switch means whenever the direction of travel of the vehicle is changed by the control means, and additional control means including a switch operated in response to passage of the vehicle past the point of attachment of the cable associated with the control means for operating the circuit means whenever the vehicle passes the point of attachment.

26. A control system for a motor operating a cable reel on a vehicle having a driving motor energized under the control of a controller through a cable carried on the reel and connected to a source of electrical energy comprising, a control resistor connected in series circuit relation with the reel motor, control switch means operable to control the connection of the control resistor in the circuit, contact means associated with the controller for controlling the operation of the control switch means in accordance with the direction of movement of the vehicle, and switch means including a pivotal arm having a guide for receiving the cable at the free end and controlling the operation of the control switch means in accordance with whichever side of the point of attachment of the cable the vehicle is operating on.

27. The combination with an electrically operated vehicle supplied with power through a cable wound on a reel carried by the vehicle, of a contactor for controlling the forward movement of the vehicle, a contactor for controlling the reverse movement of the vehicle, a torque motor for driving said cable reel, means for controlling the torque exerted by said torque motor including parallel current paths one including a resistance and the other including a switch for shunting said resistance, and means responsive to the energization of either of said two contactors for effecting closure of said switch to shunt said resistance.

28. The combination with an electrically operated vehicle supplied with power through a cable wound on a reel carried by the vehicle, of a contactor for controlling the forward movement of the vehicle, a contactor for controlling the reverse movement of the vehicle, a torque motor for driving said cable reel, means for controlling the torque exerted by said torque motor including parallel current paths one including a resistance and the other including a switch for shunting said resistance, means responsive to the energization of either of said two contactors for effecting closure of said switch to shunt said resistance, and means controlled by the direction in which said cable extends from said reel for effecting opening of said switch while the contactor whose closing caused closures of said switch remains closed.

29. The combination with an electrically operated vehicle supplied with power through a cable wound on a reel carried by said vehicle, comprising a torque motor for operating said cable reel, a resistance element connected with said motor to effect the exertion by the latter of a low torque, a contactor operable to shunt out said resistance element to permit said motor to develop a higher torque, means for guiding said cable in relatively opposite directions from said vehicle longitudinally of the latter, and means controlled by said cable guiding means for deenergizing said contactor to effect reduction of the torque of the motor when the direction in which the cable extends from the vehicle is reversed.

30. Apparatus of the character described comprising a pivotally mounted arm, a cable guide carried on the free end of said arm, means for supporting said arm for turning by the pull of the cable passing through said guide, a magnetic contactor, and a switch actuated by the movement of said arm for establishing, in opposite extreme positions of said arm, different circuits for controlling the energization of said contactor.

31. The combination with a vehicle having a cable reel mounted thereon, with the power receiving end of said cable anchored between the ends of the path of travel of the vehicle, of means operatively connected with said cable reel for rotating the same in a winding in direction and resisting the rotation thereof in an unwinding direction, means for causing said last mentioned means to exert a maximum torque when said vehicle is approaching the anchor point of said cable, and means for reducing the torque exerted to a lower value as said vehicle moves past said cable anchor point.

32. The combination with a vehicle having a cable reel mounted thereon, with the power receiving end of said cable anchored at a point along the path of travel of said vehicle, means for driving said cable reel at the required torque to wind up said cable as the vehicle approaches the anchor point, and means for automatically reducing the torque exerted by said last mentioned means when said vehicle is operating in the same direction beyond said anchor point, whereby said cable is maintained under a lower tension during the paying out thereof.

33. A control system for a motor operating a cable reel on a vehicle for a cable supplying electrical energy to the vehicle comprising means operable to vary the torque of the cable reel motor, and means responsive to the angular direction relative to the vehicle of the portion of the cable extending from the vehicle to the point of connection of the cable, operable to control the torque varying means.

34. In a control system for a torque motor operatively connected to a cable reel for a power cable supplying electrical energy to a vehicle, switch means operable to vary the armature current of the torque motor, and control means for effecting operation of said switch means, responsive to that change in the angular relation in generally horizontal planes to the vehicle of the portion of the cable extending off from the vehicle which occurs, by virtue of change in position of the vehicle, when a change from shortening to lengthening of said portion of said cable is necessary.

35. In a control system for a torque motor operatively connected to a cable reel for a power cable supplying electrical energy to a vehicle, switch means operable to vary the armature current of the torque motor, and control means for effecting operation of said switch means, responsive to that change in the angular relation in generally horizontal planes to the reel of the portion of the cable extending off from the reel which occurs, by virtue of change in position of the vehicle, when a change from shortening to lengthening of said portion of said cable is necessary.

36. The combination with a vehicle having a reel rotatably supported thereon and a flexible conductor secured at one end to said reel and having the power receiving end thereof anchored at a point relative to which said vehicle moves and at least a portion of the cable so disposed that as the vehicle travels along a working path there is a change between winding and unwinding operations, means for driving said reel at the required torque to wind up the cable as the vehicle moves in a direction to introduce slack in the cable, and means for automatically reducing the torque exerted by said last mentioned means when said vehicle continues to operate in the same direction but in a portion of its travel when unreeling of the cable is necessary, whereby said cable is maintained under a lower tension during the unreeling thereof.

37. Apparatus of the character described comprising a pivotally mounted arm, a cable guide carried on the free end of said arm, means for supporting said arm for turning by the pull of the cable passing through said guide, a magnetic contactor, switches selectively closable and a switch actuated by the movement of said arm for establishing, in opposite extreme positions of said arm, different circuits, respectively containing different ones of said selectively closable switches, for controlling the energization of said contactor.

38. The combination with a vehicle having a cable reel mounted thereon with the power receiving end of the cable at a stationary point and with said vehicle moving in a path such that the portion of the cable which leads to the vehicle is in certain portions of said path at one side of a position perpendicular to said path and at other points in said path at the opposite side of such a perpendicular, means for driving said cable reel at the required torque to wind up the cable as the vehicle operates towards the position at which such perpendicularity exists, and means for automatically reducing the torque exerted by said driving means when said vehicle is operating in the same direction but at the other side of said position at which such perpendicularity exists, whereby said cable is maintained under a lower tension during the paying out thereof than during its winding in.

39. A control system for a motor operating a cable reel on a vehicle for a cable supplying electrical energy from an extraneous source to the vehicle comprising, means operable to vary the torque of the cable reel motor, and means governed by the angular direction in generally horizontal planes of the cable, as the latter extends away from the vehicle, relative to the path of reel movement operable to control the torque varying means.

40. In a control system for a torque motor operatively connected to a cable reel for a power cable supplying electrical energy from an extraneous source to a vehicle, switch means operable to vary the armature current of the torque motor, and control means responsive to change, produced by vehicle movement, in the angle of the cable, in generally horizontal planes, as the latter extends away from the vehicle, to the path of reel movement operable to effect operation of the switch means.

JOHN D. RUSSELL.

REFERENCES CITED

The following references are of record in the file of this patent:

UNITED STATES PATENTS

| Number | Name | Date |
|---|---|---|
| 1,467,253 | Sharpsteen | Sept. 4, 1923 |
| 1,765,547 | Sloane | June 24, 1930 |
| 1,843,743 | Shaffer | Feb. 2, 1932 |
| 1,857,817 | McCann | May 10, 1932 |
| 2,359,123 | Krapf | Sept. 26, 1944 |